United States Patent
Cao et al.

(10) Patent No.: US 10,742,713 B2
(45) Date of Patent: Aug. 11, 2020

(54) ON-DEMAND SUBSCRIBED CONTENT LIBRARY

(71) Applicant: VMware, Inc., Palo Alto, CA (US)

(72) Inventors: Yanping Cao, San Carlos, CA (US); Pratima Rao, Palo Alto, CA (US); Mahdi Ben Hamida, Foster City, CA (US); Steven Sun, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 388 days.

(21) Appl. No.: 15/012,777

(22) Filed: Feb. 1, 2016

(65) Prior Publication Data
US 2017/0220661 A1 Aug. 3, 2017

(51) Int. Cl.
*H04L 29/08* (2006.01)
*G06F 16/27* (2019.01)

(52) U.S. Cl.
CPC .............. *H04L 67/06* (2013.01); *G06F 16/27* (2019.01); *H04L 67/1095* (2013.01)

(58) Field of Classification Search
CPC ...... H04L 67/06; H04L 67/1095; G06F 16/27
See application file for complete search history.

(56) References Cited

U.S. PATENT DOCUMENTS

| | | | | |
|---|---|---|---|---|
| 5,491,820 A | * | 2/1996 | Belove | G06F 17/30067 707/779 |
| 2010/0042988 A1 | * | 2/2010 | Lundin | G06F 9/44505 717/176 |
| 2010/0106852 A1 | * | 4/2010 | Kindig | G06F 17/30032 709/231 |
| 2012/0005379 A1 | * | 1/2012 | Dutch | G06F 11/1448 710/31 |
| 2013/0290952 A1 | * | 10/2013 | Childers, Jr. | G06F 9/5077 718/1 |
| 2016/0133141 A1 | * | 5/2016 | Angeles | G06F 17/30887 434/362 |

* cited by examiner

*Primary Examiner* — Charles D Adams
(74) *Attorney, Agent, or Firm* — Loza & Loza, LLP (57) ABSTRACT

A cluster management system and method for synchronizing content libraries within a distributed computer system allows an on-demand synchronization option of a content library subscribed to a publishing content library, which includes at least a consumable software item and metadata of the consumable software item, to be enabled. As a result of the on-demand synchronization option of the subscribed content library being enabled, the metadata of the consumable software item is downloaded from the publishing content library to the subscribed content library without downloading the consumable software item. The consumable software item is downloaded from the publishing content library to the subscribed content library in response to user selection of the consumable software item at the subscribed content library.

9 Claims, 7 Drawing Sheets

On-Demand Synchronization

ON-DEMAND SUBSCRIBED CONTENT LIBRARY

BACKGROUND

Virtualization allows computer resources, such as processors, computer memories, network bandwidth and data storage facilities, to be shared among resource-consuming processing entities, e.g., virtual machines (VMs), running on a distributed computer system. This sharing of computer resources can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtualized environments.

The resource-consuming processing entities can be used to form virtual data centers and other processing clusters to perform various tasks and operations. Administrators and users of these data centers and processing clusters need to efficiently manage different aspects of the data centers and processing clusters, which may involve using consumable software contents, such as virtual machine and application templates. Typically, these consumable software contents are stored in local or remote datastores that can be accessed by anyone with administrative rights to the data centers or processing clusters and their datastores. This presents a security issue since anyone with access to a data center or processing cluster and its datastore can also freely access the consumable software contents stored in the datastore, and, for example, initiate unauthorized build of resource-consuming processing entities using the consumable software contents. In addition, sharing these consumable software contents between different administrators and users can be tedious and time-consuming since the consumable contents may be stored in numerous datastores.

SUMMARY

A cluster management system and method for synchronizing content libraries within a distributed computer system allows an on-demand synchronization option of a content library subscribed to a publishing content library, which includes at least a consumable software item and metadata of the consumable software item, to be enabled. As a result of the on-demand synchronization option of the subscribed content library being enabled, the metadata of the consumable software item is downloaded from the publishing content library to the subscribed content library without downloading the consumable software item. The consumable software item is downloaded from the publishing content library to the subscribed content library in response to user selection of the consumable software item at the subscribed content library.

A method for synchronizing content libraries within a distributed computer system in accordance with an embodiment of the invention comprises subscribing a content library in the distributed computer system to a publishing content library in the distributed computer system so that the content library is set as a subscribed content library to the publishing content library, the publishing content library including at least a consumable software item and metadata of the consumable software item, enabling an on-demand synchronization option of the subscribed content library, as a result of the on-demand synchronization option of the subscribed content library being enabled, downloading the metadata of the consumable software item from the publishing content library to the subscribed content library without downloading the consumable software item, and in response to user selection of the consumable software item at the subscribed content library, downloading the consumable software item from the publishing content library to the subscribed content library so that the consumable software item can be used from the subscribed content library. In some embodiments, the steps of this method are performed when program instructions contained in a computer-readable storage medium are executed by one or more processors.

A management server supported by hardware in a distributed computer system in accordance with an embodiment of the invention comprises memory and a processor, when program instructions in the memory are executed, is configured to subscribe a content library in the distributed computer system to a publishing content library in the distributed computer system so that the content library is set as a subscribed content library to the publishing content library, the publishing content library including at least a consumable software item and metadata of the consumable software item, enable an on-demand synchronization option of the subscribed content library, as a result of the on-demand synchronization option of the subscribed content library being enabled, download the metadata of the consumable software item from the publishing content library to the subscribed content library without downloading the consumable software item, and in response to user selection of the consumable software item at the subscribed content library, download the consumable software item from the publishing content library to the subscribed content library so that the consumable software item can be used from the subscribed content library.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
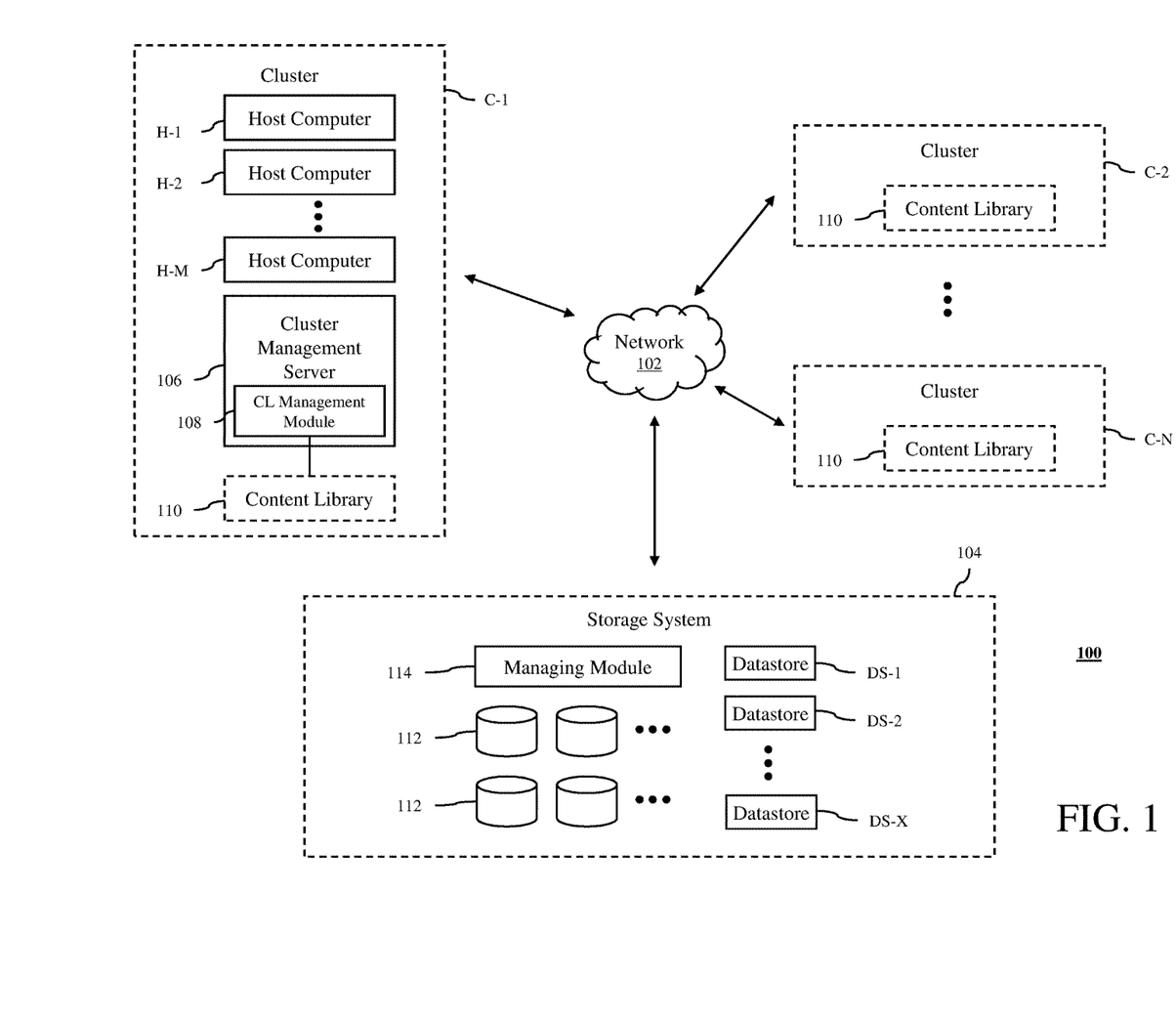
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, clusters C-1, C-2 . . . C-N (where N is a positive integer) of host computers and a storage system 104. The clusters of host computers are used to support or host multiple processing entities that can execute various applications. As used herein, the term "processing entity" is any software entity that can run on a computer system, such as a software application, a software process, a virtual machine (VM) and a "container" that provides system-level process isolation. One or more of the clusters of host computers may be grouped to form and function as a data center. The number of clusters included in the distributed computer system may be in the hundreds or more. Thus, the distributed computer system may include multiple data centers. The host computers of the different clusters may be connected to the storage system 104 via the network 102. Thus, each of the host computers in the clusters is able to access the storage system via the network and may share the resources provided by the storage system. Consequently, any process running on any of the host computers in the distributed computer system may also access the storage system via the network.

In the illustrated embodiment, each of the clusters C-1, C-2 . . . C-N includes a number of host computers H-1, H-2 . . . H-M (where M is a positive integer) and a cluster management server 106. The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have a different number of host computers. The host computers are physical computer systems that host or support one or more processing entities so that the processing entities are executing on the physical computer systems. The host computers may be servers that are commonly found in data centers. As an example, the host computers may be servers installed in one or more server racks. In an embodiment, the host computers of a cluster are located within the same server rack.

Figure 2:
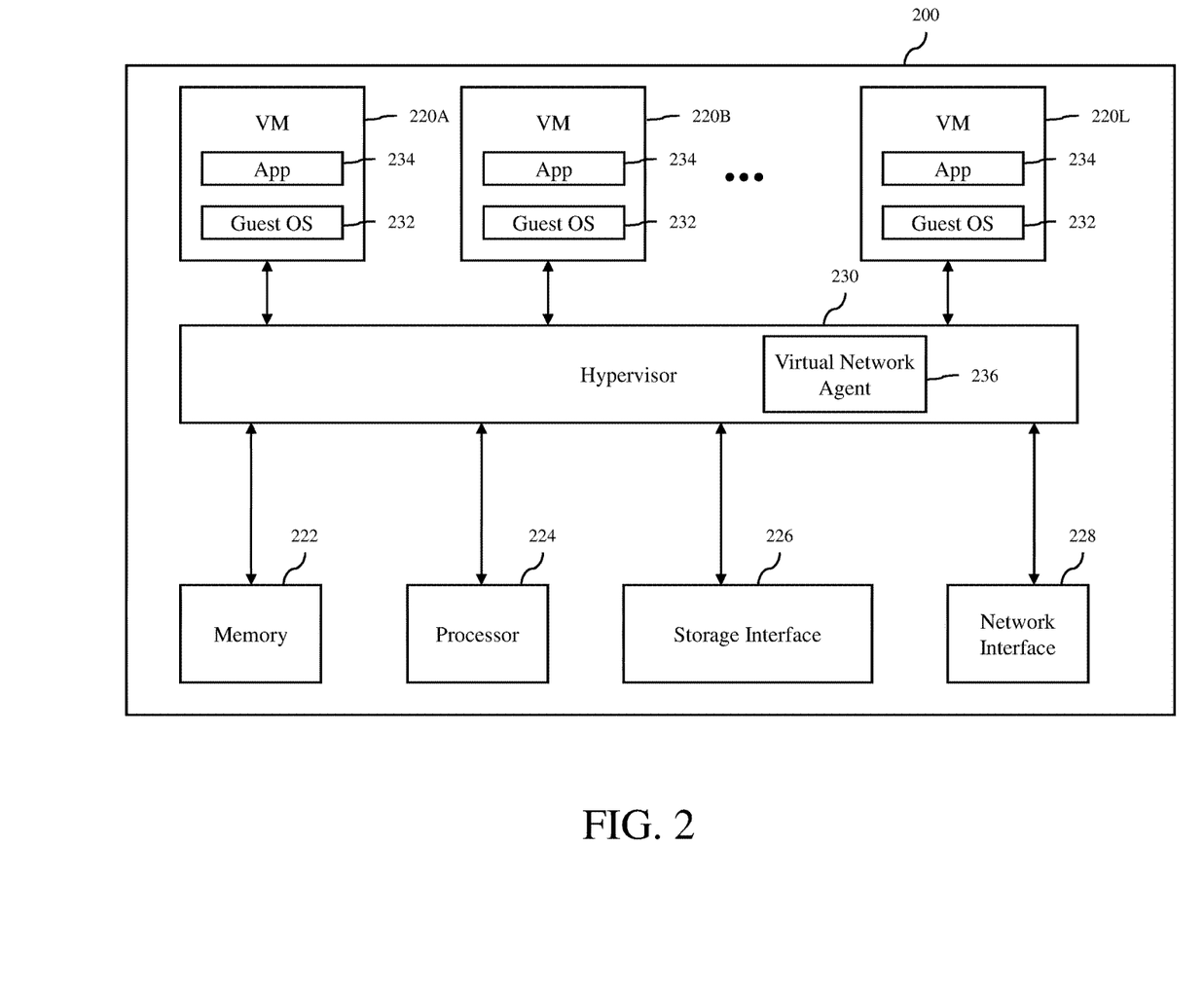
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of processing entities 220A, 220B . . . 220L (where L is a positive integer), which are VMs in this embodiment. The number of VMs supported by the host computer can be anywhere from one to more than a hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage system 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 232 and one or more guest applications (APP) 234. The guest operating system manages virtual system resources made available to the corresponding VM by the hypervisor 230, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage system 104 using the storage interface 226 of the host computer.

The host computer 200 may include a virtual network agent 236, which operates within the hypervisor 230 to provide virtual networking capabilities, such as bridging, L3 routing, L2 switching and firewall capabilities, so that software defined networks or virtual networks can be created. In a particular embodiment, the virtual network agent 236 may be part of a VMware NSX™ virtual network product installed in the distributed computer system 100.

Turning back to FIG. 1, each of the cluster management servers 106 in the clusters C-1, C-2 . . . C-N operates to monitor and manage the host computers H-1, H-2 . . . H-M in the respective cluster. Each cluster management server may be configured to monitor the current configurations of the host computers and the processing entities, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include processing entity hosting information, i.e., which processing entities are hosted or running on which host computers. The monitored configurations may also include processing entity information. The processing entity information may include size of each of the processing entities, virtualized hardware configuration of each of the processing entities, such as virtual CPU type and virtual memory size, software configuration of each of the processing entities, such as OS type and installed applications or software programs running on each of the processing entities, and virtual storage size for each of the processing entities. The processing entity information may also include resource parameter settings, such as demand, limit, reservation and share values for various resources, e.g., CPU, memory, network bandwidth and storage, which are consumed by the processing entities. The "demand," or current usage, of the processing entities for the consumable resources, such as CPU, memory, network, and storage, are measured by the host computers hosting the processing entities and provided to the respective cluster management server.

In some embodiments, the cluster management servers 106 may be physical computers with each computer including at least memory and one or more processors, similar to the host computer 200. In other embodiments, the cluster management servers may be implemented as software programs running on physical computers, such as the host computer 200 shown in FIG. 2, or virtual computers, such as the VMs 220A, 220B . . . 220L. In an implementation, the cluster management servers are VMware® vCenter™ servers with at least some of the features available for such servers.

In the illustrated embodiment, each of the cluster management servers 106 includes a content library (CL) management module 108, which is configured to create and manage one or more content libraries 110. A content library is a repository for consumable software items, such as virtual machine (VM) templates and virtual application (vApp) templates, as well as other software items, such as ISO files, scripts and text files, for example. A VM template is a master image of a virtual machine that can be used to create new virtual machines. This image typically includes an operating system, applications and configuration settings for the virtual machine. A vApp template is a VM image that is loaded with an operating system, applications and data. vApp templates ensure that virtual machines are consistently configured across an entire organization. Thus, consumable software items can be software items that are used to clone, convert or deploy processing entities. A content library may be a publishing content library, which functions as a source of software items for other content libraries that are subscribed to the publishing content library, i.e., subscribed content libraries. A subscribed content library is a content library that allows the users of the subscribed content library to easily access and use the software items of the publishing content library to which the subscribed content library is subscribed. A single publishing content library may have multiple subscribed content libraries. Thus, the use of content libraries in the distributed computer system 100 easily allows users to share and use software items, in particular the consumable software items. The content library management module 108 and content libraries are further described below.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage system 104 is used to store data for the host computers of the clusters C-1, C-2 . . . C-N, which can be accessed like any other storage device connected to computer systems. In an embodiment, the storage system can be accessed by entities, such as the cluster management servers 106, including their content library management modules 108, and the processing entities running on the host computers, using any file system, e.g., virtual machine file system (VMFS) or network file system (NFS). The storage system 104 includes one or more computer data storage devices 112, which can be any type of storage devices, such as solid-state devices (SSDs), hard disks or a combination of the two. At least some of these storage devices may be local storage devices of the host computers, e.g., locally attached disks or SSDs within the host computers. The storage devices 112 may operate as components of a network-attached storage (NAS) and/or a storage area network (SAN). The storage system may include one or more storage managing modules 114, which manage the operation of the storage system. In an embodiment, each storage managing module 114 is a computer program executing on one or more computer systems (not shown) of the storage system. The storage system supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage system. The datastores are used to store data associated with the processing entities supported by the host computers of the clusters. The same datastore may be associated with more than one cluster. For VMs, the datastores may be used to store virtual storage, e.g., virtual disks, used by each of the VMs, as well as other files needed to support the VMs, such as configuration files for the VMs. In addition, the datastores may be used to store snapshots of processing entities, e.g., VMs, which may include some or all of the files of the processing entities. Furthermore, the datastores may be used to store content libraries 108 created and managed by the content library management modules 108, as well as the contents of the content libraries. One or more datastores may be associated with one or more host computers. Thus, each host computer is associated with at least one datastore. Some of the datastores may be grouped into one or more clusters of datastores, which are commonly referred to as storage pods.

Turning back to the content library management modules 108, each of these content library management modules is configured or programmed to support a content library feature in which one or more content libraries can be created and maintained for the corresponding cluster. When a content library is created by a user using a content library management module, the content library can be configured to be a publishing content library so that one or more other content libraries can subscribe to the publishing content library. The publishing content library may be configured so that a password or other verification is required for other content libraries to subscribe to the publishing content library. The publishing content library typically includes one or more software items, which may include consumable software items, and metadata of the software items (sometimes referred to herein as "item metadata"). In an embodiment, the consumable software items may be stored as Open Virtualization Format (OVF) file format. The item metadata includes information regarding each of the software items, such as identification of the software item, creation date of the software item, software item type, name of library to which the software item belong, description of the storage item, version of the storage item, file uniform resource locator (URL) of the storage item and storage location of the software item. The item metadata may be stored as one or more files in the publishing content library that can be synchronized at any subscribed content library. In an embodiment, the item metadata may be stored as one or more JavaScript Object Notation (JSON) files. However, in other embodiments, the item metadata may be stored in the content library in any format or structure.

Alternatively, when a content library is created by a user using a content library management module 108, the content library can be configured to subscribe to a publishing content library so that the created content library can be a subscribed content library to the publishing content library. The publishing and subscribed content libraries may be created using the same content library management module in a cluster management server or different content library management modules in other cluster management servers. The subscribed content library includes options for content synchronization with the publishing content library. One content synchronization content option is to set the subscribed content library for full content download. With this full synchronization option, after a subscribed content library is created, the item metadata and all the software items in the publishing content library are downloaded to the subscribed content library, as described below using an example.

Figure 3A:
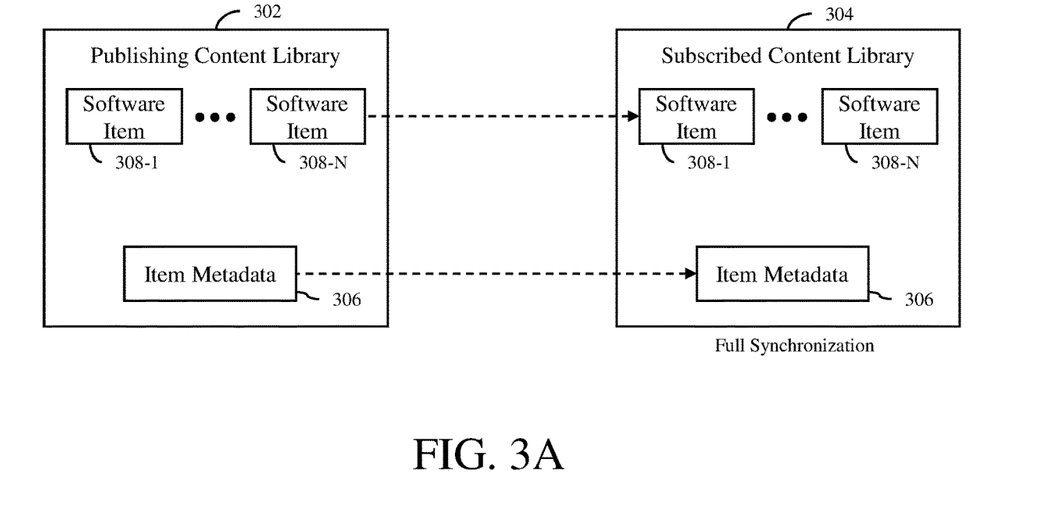
FIG. 3A illustrates an initial synchronization process of a subscribed content library with a publishing content library when the full synchronization option of the subscribed content library is enabled in accordance with an embodiment of the invention.

FIG. 3A illustrates an initial synchronization process of a subscribed content library 304 with a publishing content library 302 to which the subscribed content library is subscribed when the full synchronization option of the subscribed content library is enabled in accordance with an embodiment of the invention. The publishing content library 302 includes item metadata 306 and multiple software items 308-1 . . . 308-N (where N is an integer greater than 1), which may include consumable software items, such as VM templates and vApp templates. Thus, in FIG. 3A, the subscribed content library 304 is being synchronized with the publishing content library 302. In this example, the subscribed content library 304 has been set to the full synchronization option. Thus, the item metadata 306 and all the software items 308-1 . . . 308-N are being downloaded from the publishing content library 302 to the subscribed content library 304.

Once the subscribed content library 304 has been synchronized with the publishing content library 302, the subscribed content library may be re-synchronized with the publishing content library automatically at predetermined periods or manually in response to user input. Alternatively, the subscribed content library may be re-synchronized with the publishing content library automatically when the contents of the publishing content library have been changed.

Figure 3B:
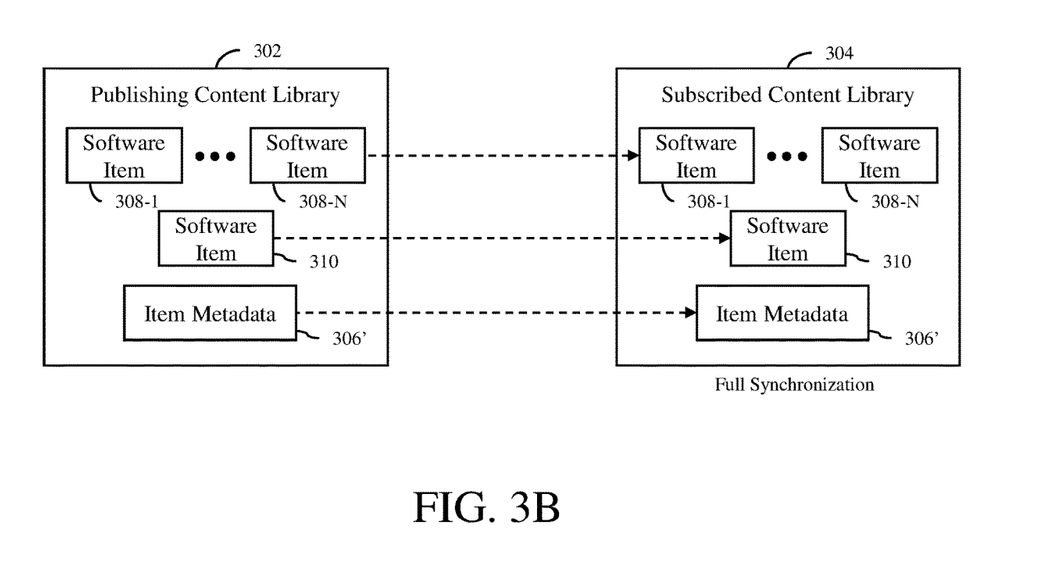
FIG. 3B illustrates a re-synchronization process of a subscribed content library with a publishing content library when the full synchronization option of the subscribed content library is enabled in accordance with an embodiment of the invention.

FIG. 3B illustrates a re-synchronization process of the subscribed content library 304 with the publishing content library 302 when the full synchronization option of the subscribed content library is enabled in accordance with an embodiment of the invention. In this example, a new software item 310 has been added to the publishing content library 302 shown in FIG. 3A. Consequently, the item metadata in the publishing content library has been changed from the item metadata 306 to item metadata 306'. Thus, in FIG. 3B, the new software item 310 is being downloaded from the publishing content library 302 to the subscribed content library 304. In addition, the software items 308-1 . . . 308-N in the subscribed content library 304 are synchronized with the software items 308-1 . . . 308-N in the publishing content library 302 since one or more of these software items in the publishing content library 302 may have been modified or changed since previous synchronization process. In addition, the previous item metadata 306 in the subscribed content library 304 is being synchronized with the item metadata 306' in the publishing content library 302 so that both the publishing and subscribed content libraries include the latest item metadata 306'.

The other content synchronization option is to set a subscribed content library for on-demand content download. With this on-demand synchronization option, after the subscribed content library is created, only the item metadata in the publishing content library is downloaded to the subscribed content library, as described below using an example.

Figure 4A:
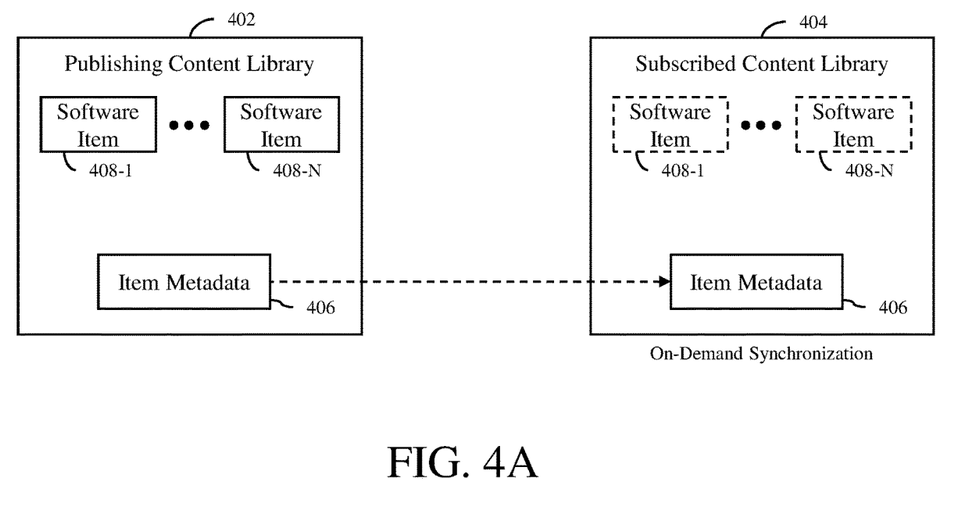
FIG. 4A illustrates an initial synchronization process of a subscribed content library with a publishing content library when the on-demand synchronization option of the subscribed content library is enabled in accordance with an embodiment of the invention.

FIG. 4A illustrates an initial synchronization process of a subscribed content library 404 with a publishing content library 402 to which the subscribed content library is subscribed when the on-demand synchronization option of the subscribed content library is enabled in accordance with an embodiment of the invention. The publishing content library 402 includes item metadata 406 and software items 408-1 ... 408-N (where N is an integer greater than 1). In this example, the subscribed content library 404 has been set to the on-demand synchronization option. Thus, the item metadata 406 is downloaded from the publishing content library 402 to the subscribed content library 404, but none of the software items 408-1 ... 408-N are downloaded from the publishing content library to the subscribed content library. Although the software items 408-1 ... 408-N are not actually downloaded to the subscribed content library 404, the software items may be indicated as being available in the subscribed content library using the item metadata 406. Thus, in FIG. 4A, these available software items 408-1 ... 408-N in the subscribed content library 402 are illustrated as being phantom items.

However, when a user of the subscribed content library 404 selects a software item for use, that particular software item is downloaded on-demand from the publishing content library 402 to the subscribed content library 404. Thus, when the on-demand synchronization option of the subscribed content library 404 is enabled, the software items are only downloaded from the publishing content library to the subscribed content library when the software items are needed at the subscribed content library. The downloaded software items are maintained at the subscribed content library 404 until the software items are evicted or deleted from the subscribed content library either individually, entirely or in groups. However, the downloaded software items in the subscribed content library 404 may be replaced if different versions of the software items are downloaded from the publishing content library 402 to the subscribed content library 404.

Figure 4B:
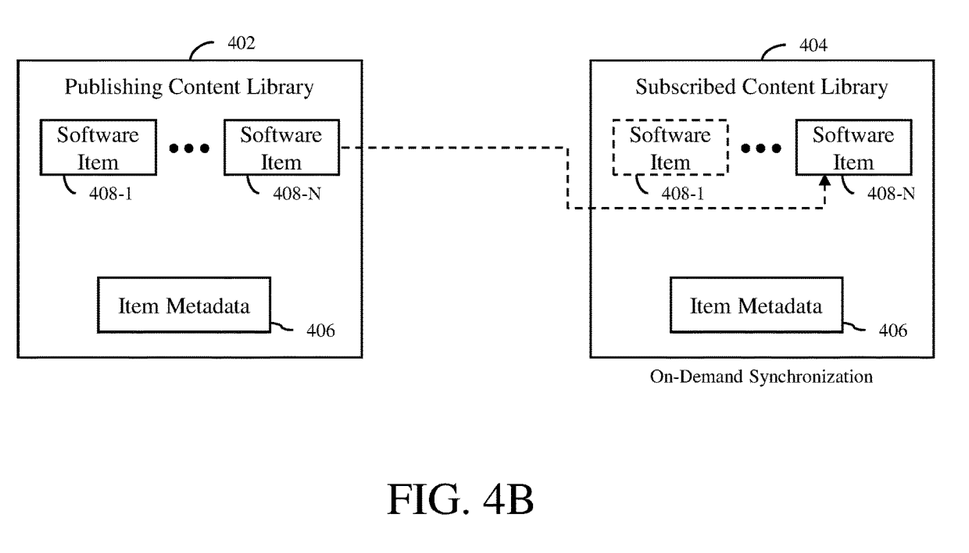
FIG. 4B illustrates an on-demand downloading process of a subscribed content library with a publishing content library when the on-demand synchronization option of the subscribed content library is enabled in accordance with an embodiment of the invention.

FIG. 4B illustrates an on-demand downloading process of the subscribed content library 404 with the publishing content library 402 when the on-demand synchronization option of the subscribed content library is enabled in accordance with an embodiment of the invention. In this example, a user of the subscribed content library 404 selects one of the phantom software items, i.e., the phantom software item 408-N, in the subscribed content library for use. In response, the actual software item 408-N is downloaded from the publishing content library 402 to the subscribed content library 404.

Similar to the subscribed content library 304 shown in FIGS. 3A and 3B with the full synchronization option enabled, once the subscribed content library 404 with the on-demand synchronization option enabled has been synchronized with the publishing content library 402, the subscribed content library 404 may be re-synchronized with the publishing content library 402 automatically at predetermined periods or manually in response to user input. Alternatively, the subscribed content library 404 may be re-synchronized with the publishing content library 402 automatically when the contents of the publishing content library 402 have been changed. However, since the subscribed content library 404 has the on-demand synchronization option enabled, only the item metadata is synchronized. Consequently, the subscribed content library 404 is not synchronized to the publishing content library 402 with respect to any software items. Thus, if one or more new software items have been added to the publishing content library 402, these new software items will not be downloaded to the subscribed content library 404. Similarly, if one or more software items are deleted from the publishing content library 402, the deletion of these software items will not be reflected in the subscribed content library 404 even if these software items have been previously downloaded on-demand from the publishing content library 402 to the subscribed content library 404, and currently stored in the subscribed content library 404.

Figure 4C:
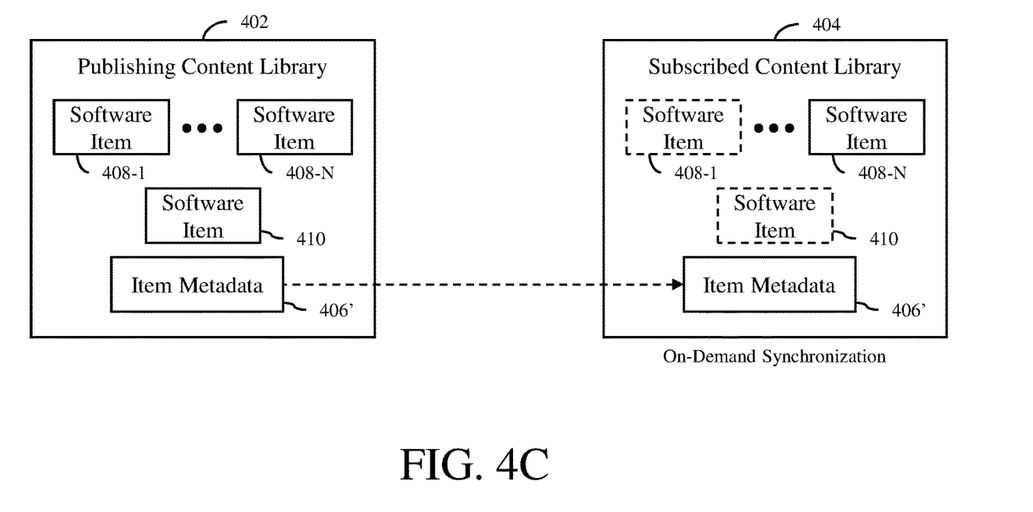
FIG. 4C illustrates a re-synchronization process of a subscribed content library with a publishing content library when the on-demand synchronization option of the subscribed content library is enabled in accordance with an embodiment of the invention.

FIG. 4C illustrates a re-synchronization process of the subscribed content library 404 with the publishing content library 402 when the on-demand synchronization option of the subscribed content library is enabled in accordance with an embodiment of the invention. In this example, a new software item 410 has been added to the publishing content library 402. Consequently, the item metadata in the publishing content library 402 has been changed from the item metadata 406 to item metadata 406'. Thus, the previous item metadata 406 in the subscribed content library 404 is synchronized with the item metadata 406' in the publishing content library. However, the new software item 410 in the publishing content library 402 is not downloaded from the publishing content library to the subscribed content library 404. In addition, none of the downloaded software items, e.g., the software item 408-N, in the subscribed content library 404 are affected by the re-synchronization process. Thus, none of the downloaded software items in the subscribed content library 404 are deleted or modified due to the re-synchronization process.

The on-demand synchronization option for a subscribed content library allows significant reduction in storage use for the subscribed content library. This may be an important factor when storage space is limited for the cluster that is associated with a subscribed content library. Thus, even if storage space is limited, a user can create and use a subscribed content library since the storage requirement for the subscribed content library with just the item metadata will be minimal. This minimal storage requirement for the subscribed content library can be maintained by evicting or deleting a software item that has been downloaded from the publishing content library to the subscribed content library. When the deleted software item is again needed, the deleted software item can be downloaded from the publishing content library to the subscribed content library.

Figure 5:
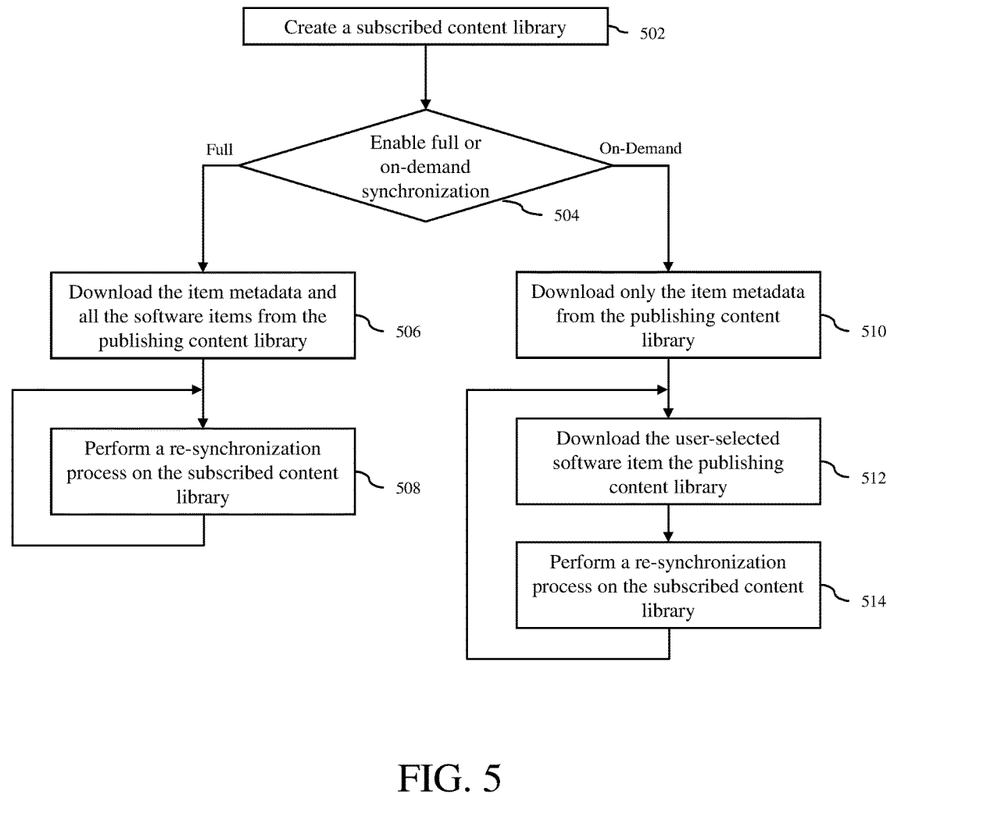
FIG. 5 is a flow diagram of an operation of the distributed computer system with respect to subscribed content libraries in accordance with an embodiment of the invention.

An operation of the distributed computer system 100 with respect to subscribed content libraries in accordance with an embodiment of the invention is described with reference to a flow diagram of FIG. 5. At block 502, in response to user input at a cluster management server 106 in the distributed computer system, a subscribed content library associated with that cluster management server is created by the content library management module 108 of that cluster management server. As part of this creation step, the subscription content library is subscribed to a publishing content library, which can be associated with the same cluster management server or another cluster management server in the distributed computer system, according to the user input. In a particular implementation, the subscription content library may be subscribed to the publishing content library using a pointer, such as a uniform resource locator (URL), to the publishing content library.

Next, at block 504, in response to another user input, a full synchronization option or an on-demand synchronization option is enabled for the subscribed content library. If the full synchronization option is enabled, the operation proceeds to block 506, where the item metadata and all the software items in the publishing content library are downloaded to the subscribed content library. Next, at block 508, a re-synchronization process is performed on the subscribed content library by the content library management module 108, which involves synchronizing the subscribed content library with the subscribed content library with respect to the software items and the item metadata in the publishing content library. With the full synchronization option enabled, this re-synchronization process includes updating the item metadata and all the software items in the subscribed content library to correspond to the item metadata and the software items in the publishing content library. The re-synchronization process may be repeated periodically or as needed. The re-synchronization process may also be performed in response to manual user input. The item metadata in the subscribed content library may be synchronized with the item metadata in the publishing content library using a synchronization mechanism. If JSON files are used for the item metadata, a synchronization mechanism that synchronizes the JSON files at the different content libraries may be used. The downloading of software items from the publishing content library to the subscribed content library may be accomplished using a connection based on Hypertext Transfer Protocol (HTTP) or any data transmission/downloading/replication process. As an example, the downloading of software items from the publishing content library to the subscribed content library may alternatively be accomplished using a storage file copy process, such as a storage file copy process at the storage system level or a proprietary storage file copy process, e.g., VMware's Network File Copy (NFC) process.

However, if the on-demand synchronization option is enabled at block 504, the operation proceeds to block 510, where only the item metadata in the publishing content library are downloaded to the subscribed content library. Thus, with the on-demand synchronization option enabled, the software items in the publishing content library are not downloaded to the subscribed content library. Next, at block 514, in response to user selection of a software item at the subscribed content library, the selected software item is downloaded from the publishing content library to the subscribed content library. The on-demand downloading of software items from the publishing content library to the subscribed content library may be accomplished using a connection based on Hypertext Transfer Protocol (HTTP).

Next, at block 512, a re-synchronization process is performed on the subscribed content library by the content library management module 108, which involves synchronizing the subscribed content library with the publishing content library with respect to only the item metadata in the publishing content library. Thus, the subscribed content library is not synchronized with the publishing content library with respect to the software items in the publishing content library. With the on-demand synchronization option enabled, this re-synchronization process includes updating only the item metadata in the subscribed content library to correspond to the item metadata in the publishing content library. Any software items in the subscribed content library are not synchronized with the software items in the publishing content library. Thus, no software items are added to or deleted from the subscribed content library as part of the re-synchronization process. The re-synchronization process may be repeated periodically or as needed. The re-synchronization process may also be performed in response to manual user input. As noted above, the item metadata in the subscribed content library may be synchronized with the item metadata in the publishing content library using a synchronization mechanism. If JSON files are used for the item metadata, a synchronization mechanism that synchronizes the JSON files at the different content libraries may be used.

Regardless of whether the full or on-demand synchronization option is enabled, the re-synchronization process on the subscribed content library may be repeated as long as the subscribed content library is active or until the subscribed content library is deleted. In some embodiments, further re-synchronization processes on the subscribed content library may be stopped by user input.

Figure 6:
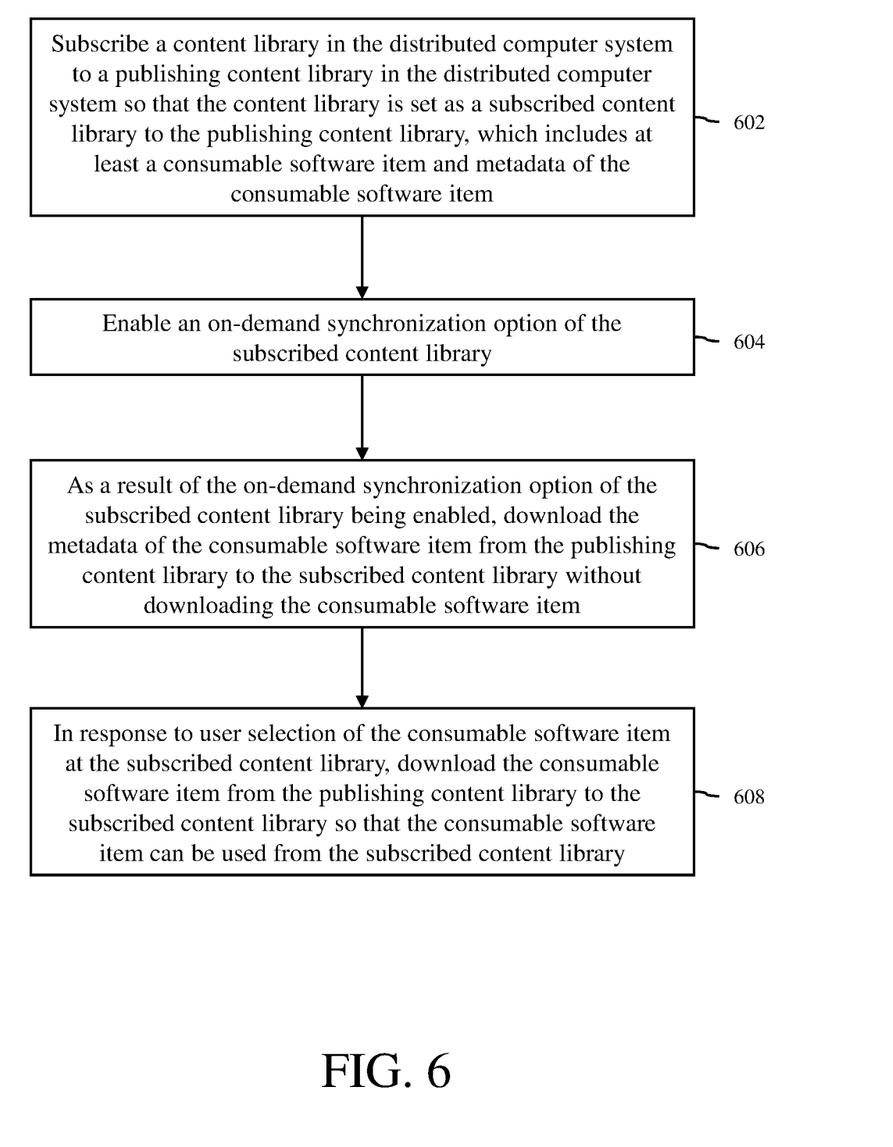
FIG. 6 is a flow diagram of a method for synchronizing content libraries within a distributed computer system in accordance with an embodiment of the invention.

A method for synchronizing content libraries within a distributed computer system in accordance with an embodiment of the invention is described with reference to a flow diagram of FIG. 6. At block 602, a content library in the distributed computer system is subscribed to a publishing content library in the distributed computer system so that the content library is set as a subscribed content library to the publishing content library, which includes at least a consumable software item and metadata of the consumable software item. At block 604, an on-demand synchronization option of the subscribed content library is enabled. At block 606, as a result of the on-demand synchronization option of the subscribed content library being enabled, the metadata of the consumable software item is downloaded from the publishing content library to the subscribed content library without downloading the consumable software item. At block 608, in response to user selection of the consumable software item at the subscribed content library, the consumable software item is downloaded from the publishing content library to the subscribed content library so that the consumable software item can be used from the subscribed content library.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for synchronizing content libraries within a distributed computer system, the method comprising:
    subscribing a content library in the distributed computer system to a publishing content library in the distributed computer system so that the content library is set as a subscribed content library to the publishing content library, the publishing content library including a plurality of consumable software items and a metadata JavaScript Object Notation (JSON) file of the consumable software items, wherein the metadata JSON file contains information regarding the consumable software items in the publishing content library;
    enabling an on-demand synchronization option of the subscribed content library;
    as a result of the on-demand synchronization option of the subscribed content library being enabled, downloading the metadata JSON file of the consumable software items from the publishing content library to the subscribed content library without downloading the consumable software items;
    in response to user selection of a consumable software item at the subscribed content library, downloading the consumable software item from the publishing content library to the subscribed content library so that the consumable software item can be used from the subscribed content library;
    performing a re-synchronization process on the subscribed content library to only synchronize the metadata JSON file in the subscribed content library with the metadata JSON file in the publishing content library without synchronizing any consumable software item in the subscribed content library with any consumable software item in the publishing content library, wherein when a particular consumable software item is deleted from the publishing content library, the deletion of the particular consumable software item is not reflected in the subscribed content library when the particular consumable software item has been previously downloaded from the publishing content library to the subscribed content library and currently stored in the subscribed content library;
    maintaining a minimal storage requirement for the subscribed content library by deleting the consumable software item in the subscribed content library that was downloaded from the publishing content library; and
    after the consumable software item is deleted from the subscribed content library, downloading the previously deleted consumable software item again from the publishing content library to the subscribed content library in response to another user selection of the consumable software item at the subscribed content library, wherein the consumable software item comprises a virtual machine template from which a virtual machine is created.

2. The method of claim 1, wherein the consumable software item is stored in the publishing content library as Open Virtualization Format (OVF) file format.

3. The method of claim 1, wherein the downloading of the consumable software item from the publishing content library to the subscribed content library includes downloading the consumable software item from the publishing content library to the subscribed content library over a connection based on Hypertext Transfer Protocol (HTTP).

4. The method of claim 1, wherein the metadata JSON file, for each consumable software item, includes a creation date, a version information, a name of a library to which the consumable software item belongs and a file uniform resource locator (URL).

5. A non-transitory computer-readable storage medium containing program instructions for synchronizing content libraries within a distributed computer system, wherein execution of the program instructions by one or more processors of a computer system causes the one or more processors to perform steps comprising:
    subscribing a content library in the distributed computer system to a publishing content library in the distributed computer system so that the content library is set as a subscribed content library to the publishing content library, the publishing content library including a plurality of consumable software items and a metadata JavaScript Object Notation (JSON) file of the consumable software items, wherein the metadata JSON file contains information regarding the consumable software items in the publishing content library;
    enabling an on-demand synchronization option of the subscribed content library;
    as a result of the on-demand synchronization option of the subscribed content library being enabled, downloading the metadata JSON file of the consumable software items from the publishing content library to the subscribed content library without downloading the consumable software items;
    in response to user selection of a consumable software item at the subscribed content library, downloading the consumable software item from the publishing content library to the subscribed content library so that the consumable software item can be used from the subscribed content library;
    performing a re-synchronization process on the subscribed content library to only synchronize the metadata JSON file in the subscribed content library with the metadata JSON file in the publishing content library without synchronizing any consumable software item in the subscribed content library with any consumable software item in the publishing content library, wherein when a particular consumable software item is deleted from the publishing content library, the deletion of the particular consumable software item is not reflected in the subscribed content library when the particular consumable software item has been previously downloaded from the publishing content library to the subscribed content library and currently stored in the subscribed content library;
    maintaining a minimal storage requirement for the subscribed content library by deleting the consumable software item in the subscribed content library that was downloaded from the publishing content library; and after the consumable software item is deleted from the subscribed content library, downloading the previously deleted consumable software item again from the publishing content library to the subscribed content library in response to another user selection of the consumable software item at the subscribed content library, wherein the consumable software item comprises a virtual machine template from which a virtual machine is created.

6. The non-transitory computer-readable storage medium of claim 5, wherein the downloading of the consumable software item from the publishing content library to the subscribed content library includes downloading the consumable software item from the publishing content library to the subscribed content library over a connection based on Hypertext Transfer Protocol (HTTP).

7. A management server supported by hardware in a distributed computer system comprising:
   memory;
   a processor, when program instructions in the memory are executed, is configured to:
      Subscribe a content library in the distributed computer system to a publishing content library in the distributed computer system so that the content library is set as a subscribed content library to the publishing content library, the publishing content library including a plurality of consumable software items and a metadata JavaScript Object Notation (JSON) file of the consumable software items, wherein the metadata JSON file contains information regarding the consumable software items in the publishing content library;
      enable an on-demand synchronization option of the subscribed content library;
      as a result of the on-demand synchronization option of the subscribed content library being enabled, download the metadata JSON file of the consumable software items from the publishing content library to the subscribed content library without downloading the consumable software items;
      In response to user selection of a consumable software item at the subscribed content library, download the consumable software item from the publishing content library to the subscribed content library so that the consumable software item can be used from the subscribed content library;
      perform a re-synchronization process on the subscribed content library to only synchronize the metadata JSON file in the subscribed content library with the metadata JSON file in the publishing content library without synchronizing any consumable software item in the subscribed content library with any consumable software item in the publishing content library, wherein when a particular consumable software item is deleted from the publishing content library, the deletion of the particular consumable software item is not reflected in the subscribed content library when the particular consumable software item has been previously downloaded from the publishing content library to the subscribed content library and currently stored in the subscribed content library;
      maintain a minimal storage requirement for the subscribed content library by deleting the consumable software item in the subscribed content library that was downloaded from the publishing content library; and
      after the consumable software item is deleted from the subscribed content library, download the previously deleted consumable software item again from the publishing content library to the subscribed content library in response to another user selection of the consumable software item at the subscribed content library, wherein the consumable software item comprises a virtual machine template from which a virtual machine is created.

8. The management server of claim 7, wherein the consumable software item is stored in the publishing content library as Open Virtualization Format (OVF) file format.

9. The management server of claim 7, wherein the processor is configured to download the consumable software item from the publishing content library to the subscribed content library over a connection based on Hypertext Transfer Protocol (HTTP).

* * * * *